United States Patent
Rabault et al.

(10) Patent No.: US 6,790,466 B1
(45) Date of Patent: Sep. 14, 2004

(54) FOOD PRODUCT COMPRISING A SOLID MASS BASE ON CHOCOLATE OR THE LIKE IN CONTACT WITH A HUMID MASS

(75) Inventors: Jean-Luc Rabault, Breuillet (FR); Francoise Warin, Bagneux (FR); Christophe Loisel, Soisy-sur-Seine (FR)

(73) Assignee: Compagnie Gervais Danone, Levallois-Perret (FR)

( * ) Notice: Subject to any disclaimer, the term of this patent is extended or adjusted under 35 U.S.C. 154(b) by 0 days.

(21) Appl. No.: 09/979,145

(22) PCT Filed: May 19, 2000

(86) PCT No.: PCT/FR00/01387

§ 371 (c)(1),
(2), (4) Date: Feb. 12, 2002

(87) PCT Pub. No.: WO00/70960

PCT Pub. Date: Nov. 30, 2000

(30) Foreign Application Priority Data

May 21, 1999 (FR) ............................................. 99 06481

(51) Int. Cl.$^7$ ................................................. A23G 1/00
(52) U.S. Cl. .............................. 426/93; 426/98; 426/89; 426/99; 426/631; 426/660
(58) Field of Search .......................... 426/631, 89, 93, 426/99, 98, 660

(56) References Cited

U.S. PATENT DOCUMENTS

| | | | | |
|---|---|---|---|---|
| 3,769,030 A | * | 10/1973 | Kleinert | 426/45 |
| 3,966,997 A | * | 6/1976 | Warkentin | 426/631 |
| 4,011,349 A | * | 3/1977 | Riesen | 426/548 |
| 4,078,093 A | * | 3/1978 | Girsh | 426/593 |
| 4,888,187 A | | 12/1989 | Given, Jr. et al. | |
| 5,626,900 A | * | 5/1997 | Miller | 426/580 |
| 5,820,913 A | | 10/1998 | Grassler et al. | |
| 5,882,709 A | * | 3/1999 | Zumbe | 426/481 |
| 5,932,277 A | * | 8/1999 | Dubberke | 426/631 |
| 5,962,063 A | * | 10/1999 | Siukola et al. | 426/631 |
| 5,965,179 A | * | 10/1999 | Ducret et al. | 426/72 |
| 5,989,619 A | * | 11/1999 | Zumbe et al. | 426/631 |
| 6,143,350 A | * | 11/2000 | Dubberke | 426/631 |
| 6,165,540 A | * | 12/2000 | Traitler et al. | 426/631 |
| 6,203,831 B1 | | 3/2001 | Eder et al. | |
| 6,231,902 B1 | | 5/2001 | Grassler et al. | |
| 6,261,627 B1 | * | 7/2001 | Armstrong et al. | 426/584 |
| 6,296,891 B1 | * | 10/2001 | Zumbe et al. | 426/631 |
| 6,305,275 B2 | | 10/2001 | Grassler et al. | |
| 6,309,689 B1 | * | 10/2001 | Weaber et al. | 426/588 |
| 6,391,373 B1 | * | 5/2002 | Kaiser et al. | 426/631 |
| 6,582,747 B2 | * | 6/2003 | Myers et al. | 426/593 |

FOREIGN PATENT DOCUMENTS

| | | |
|---|---|---|
| EP | 0 615 692 | 3/1993 |
| EP | 0 664 959 | 1/1994 |
| EP | 0 686 354 | 12/1995 |
| EP | 0 770 332 | 5/1997 |
| EP | 0 839 456 | 5/1997 |
| FR | 2 759 255 | 8/1998 |
| WO | WO 97/15198 | 5/1997 |

OTHER PUBLICATIONS

Derwent Abstract of EP 0 839 456.
Derwent Abstract of EP 0 770 332.
Derwent Abstract of EP 615 692.
Derwent Abstract of EP 686 654.
Derwent Abstract of FR 2 759 255.
US 2001/0018083, published on Aug. 30, 2001.
US 2001/0007692, published on Jul. 12, 2001.

* cited by examiner

Primary Examiner—Carolyn Paden
(74) Attorney, Agent, or Firm—Finnegan, Henderson, Farabow, Garrett & Dunner, LLP

(57) ABSTRACT

A food product comprising a substantially solid mass based on chocolate or the like in contact with a wet medium in non-frozen state, with a local free moisture content ranging between 45 and 88%, said substantially solid mass having a low water intake in suitable conditions of preservation. The substantially solid mass of chocolate or chocolate-like product comprises in weight percentages: between 43 and 50% fat; defatted dry cocoa <18%; skimmed milk powder <17%; sugars >13%; the weight ratio defatted dry cocoa/(sugars and optionally skimmed milk powder) being less that 0.45 and the solid mass being such that for the aqueous medium, the value ($\tau$) is less than 3, where $\tau=(-[water]+0.37)\times F+(5.25\times[water]-1.67)\times(S+SMP)+(26.6\times[water]-9.6)\times C+(61\times[water]-14.5)\times(S+SMP)\times C$.

19 Claims, No Drawings

FOOD PRODUCT COMPRISING A SOLID MASS BASE ON CHOCOLATE OR THE LIKE IN CONTACT WITH A HUMID MASS

This application is a national stage filing under 35 U.S.C. § 371 of international application no. PCT/FR00/01387, filed on May 19, 2000. This application also claims the benefit of priority under 35 U.S.C. § 119(a) to French patent application no. 99/06,481, filed on May 21, 1999.

BACKGROUND OF THE INVENTION

The present invention relates to a food product comprising a substantially solid mass based on chocolate or a chocolate-like product in contact with a moist medium in the non-gelled state, which is in particular a milk base, having a local free water content of between 45 and 88%, said substantially solid mass having a low water uptake under appropriate preservation conditions. The invention therefore relates to compositions intended to be maintained in a refrigerated state, but does not relate to ice creams.

Food bars are known which consist of a filling coated with a shell made of chocolate or a chocolate-like product.

Food compositions are also known which are loaded with chips of chocolate or a chocolate-like product. In other words, these compositions consist, on the one hand, of a continuous phase, the term "continuous" being taken in a very broad sense which covers, for example, vienna-type products, pastry bases, and, on the other hand, granules or chips of chocolate or the like.

Multilayer structures are also known which consist of layers of chocolate or a chocolate-like product separated by pastry layers based on milk or non-milk materials of the jam type.

The filling of food bars or the continuous phase of these food compositions or the pastry or milk-based layers should have a low local free water (or LFW) content in order to avoid hydration of the solid chocolate masses. Indeed, in the case where the local free water content of the filling or of the continuous phase is too high, hydration of the solid masses of chocolate or the like occurs, leading to several negative effects which make the food product unfit for marketing.

On the one hand, the chocolate or chocolate-like product being a product which is naturally contaminated, its hydration causes the development of bacteria which contaminate the moist medium, which is unacceptable because of the preservation standards required in industrialized countries.

On the other hand, the taste value of the solid masses of chocolate or a chocolate-like product lies in their "crunchy" character which is specific to this substance. Excessive hydration (migration of the water across the thickness of the chocolate) causes its decolorization, except for white chocolate, and its gradual softening (destruction and loss of crunchiness) by the outside and leads to rejection of such a food product by the consumer.

The production of a chocolate or a chocolate-like product which is resistant to water is therefore of major interest for the development of food products comprising a phase whose local content of water is high, in contact with a solid mass of chocolate or a chocolate-like product.

Conventional chocolates as this is well known can be divided into three categories according to the cocoa content:
dark chocolate about 19% of dry and defatted cocoa,
milk chocolate about 6% of dry and defatted cocoa,
white chocolate 0% of dry and defatted cocoa.

In milk and white chocolates, a portion or the whole of the dry and defatted cocoa is replaced by milk fat or milk particles. The normal sugar content of chocolates is of the order of 25 to 57%. These chocolates exhibit an excessive water uptake for the desired applications indicated above.

Accordingly, it has already been proposed to modify the compositions of chocolate or a chocolate-like product so as to adapt them to the abovementioned embodiments.

Patent EP 615 692 describes a refrigerated product containing pieces of chocolate which can be preserved for 5 to 6 weeks in the refrigerator and whose pieces preserve their integrity well during this lapse of time.

This patent indicates that the sugar level is between 1 and 10% and preferably between 1 and 3%. However, such an embodiment leads to solid masses of chocolate or a chocolate-like product having a bitter taste which can put off certain consumers. Furthermore, in order to mask this bitterness as much as possible, it is necessary to limit the size of the chocolate particles, in particular between 1 and 4 mm.

Patent application EP-A-664 959 describes a composition containing an edible fat in a substantially solid form in contact with a non-gelled moist medium. This patent application relates in particular to a chocolate composition which has a fat content (cocoa butter or vegetable oil) greater than 70% by weight and a dry and defatted cocoa/sugar ratio $\geq 0.5$.

It is indeed taught that a fat level of less than 70%, and more particularly of less than 85%, leads to chocolates which become hydrated in contact with the moist medium and which soften over time. It will be noted that in comparative trials, a chocolate composition containing 55% of cocoa butter, 30% of sugars and 15% of dry and defatted cocoa leads to a water uptake of 16% and to a soft surface, after only two weeks of preservation. This water uptake is measured by the method described in "REGULATIONS for chemical physical and microbiological research in the dairy industry, a publication of the Koninklijke Nederlandse Zuivelbond FNZ (Royal Dutch Dairy Association)".

On the other hand, the compositions having a fat level of 85% have a low water uptake and preserve their crunchy character.

The chocolates thus produced are therefore either very unbalanced from the organoleptic point of view (bitter, not sweet, low flavor), or reveal a fatty mouthfeel and give a bad nutritional image because of the very high fat content. Furthermore, chocolates with a high fat content have a high cost.

Patent application EP-A-770 332 also describes a food product in which one or more layers consist of a breakable solid mass of chocolate. The chocolate layer has a thickness of between 0.1 and 3 mm and a sugar syrup content of less than 17%, preferably between 2 and 3%. According to this document, such a layer preserves the crunchy character desired by the consumer.

It will be noted that this document presents a teaching similar to patent application EP-A-615 692 since in both cases, it is recommended to minimize the sugar content, which leads to very unbalanced chocolates from the organoleptic point of view (bitter, not sweet, low flavor).

Application WO 97/15198 describes barrier layers between two media with different Aw values, these barrier layers consisting essentially of fat or of a mixture of fat and lactose. This document recommends not introducing sucrose into the composition of the barrier layers because that reduces the performance of the barrier.

After systematic studies, the applicant has demonstrated that, contrary to the teachings described in the abovementioned documents, the water-resistant character of the chocolate was not linked to the low sugar content. Because of this, the invention breaks with the bias according to which sugar is more unfavorable to water resistance than cocoa. Moreover, the invention shows that it is possible to produce water-resistant chocolates whose fat content is less than 80% preferably less than 70% depending on the nature of the moist medium, while preserving a good organoleptic balance.

SUMMARY OF THE INVENTION

The applicant has found that a novel chocolate or chocolate-like product composition in the form of a solid mass made it possible to use said mass of chocolate or a chocolate-like product in combination with a moist medium, in particular a milk base, while preserving the desired crunchy character.

In general, the invention is characterized in that the substantially solid mass of chocolate or a chocolate-like product comprises, as a percentage by weight:

| | |
|---|---|
| fat | 43 to 80% |
| dry and defatted cocoa | <18% |
| skimmed milk powder | <17% |
| sugars | >13% | the dry and defatted cocoa/(sugars and optionally skimmed milk powder) weight ratio being less than 0.45 and the solid mass being such that for a moist medium having a local free water content of between 45 and 88%, the parameter ($\tau$) is less than 3, the parameter $\tau$ being defined by the equation (1):

$$\tau=(-[\text{water}]+0.37)\times F+(5.25\times[\text{water}]-1.67)\times(S+SMP)+(26.2\times[\text{water}]-9.6)\times C+(61\times[\text{water}]-14.5)\times(S+SMP)\times C \text{ with:}$$

[water] is the local free water content of the moist phase in contact (in g/g),

F is the fat content of the chocolate or equivalent (in g/g),

S+SMP is the content of sugars+skimmed milk powder of the chocolate or equivalent (in g/g), C is the dry and defatted cocoa content of the chocolate or equivalent (in g/g).

This makes it possible to obtain chocolates which are very water-resistant, in particular for fat contents of greater than or equal to 70%.

DETAILED DESCRIPTION OF THE INVENTION

According to another embodiment of food compositions according to the invention, the dry and defatted cocoa/(sugars+optionally skimmed milk powder) weight ratio is less than or equal to 1.2, and the substantially solid mass of chocolate or chocolate-like product has a fat content of between 43 and 70%.

These solid masses in contact with a moist medium are resistant to water for two to five weeks, at a temperature of between 0° C. and 12° C., which constitutes the desired preservation conditions for this type of food composition.

The local free water content [local free water] is defined by the equation:

$$[\text{local free water}]=[\text{total water}]\times A_{w\ 25°\ C.}/(100-F)$$

in which:

[local free water] is given in grams of water per 100 grams of product

F is given in grams of fat per 100 grams of product.

For example, for a non-fatty moist base containing 77% of water and with $A_{w\ 25°\ C.}$ of 0.96, the local free water content is 73.9%.

According to one variant, the proportion of dry and defatted cocoa and of skimmed milk powder is such that their sum is less than 25%.

The invention is therefore defined in particular by a test described in the form of a mathematical equation which saves persons skilled in the art from carrying out the experiments. However, insofar as may be necessary, an experimental procedure is indicated below which allows persons skilled in the art to determine the compositions which satisfy the objectives which the invention proposes to achieve.

The test is carried out, for example, which consists in bringing slices of chocolate 1.5±0.2 mm thick and 20 mm in diameter into contact with an agar gel having a determined local free water content of 74%. The chocolate slices are obtained after tempering and cooling the chocolate to 13° C., storing for 2 days at 20° C. and then for 12 hours at 10° C. The gel is poured into syringes which are cut at their end and then covered with the slice of chocolate and are then closed again. The whole is stored for 35 days at 10° C. and the water uptake of the slice of chocolate is measured at D35 by the "Karl Fischer" method, OICC No. 105 (1988).

The compositions which satisfy the criteria of the invention are those whose percentage of water uptake after 35 days of preservation at 10° C. will be <17.7%; the table below gives an indication of the percentages of water uptake after 35 days at 10° C. according to the water resistance of the chocolate.

| % water uptake | Water resistance |
|---|---|
| >17.7 | No resistance |
| 11.8 to 17.7 | Average resistance |
| 5.9 to 11.8 | Good resistance |
| <5.9 | Very good resistance |

A gel composition having a local free water content of up to 74% is given below.

| | |
|---|---|
| Water | 77% |
| Sucrose | 8% |
| Dextrose monohydrate | 13% |
| Agar | 1.5% |
| Potassium sorbate | 0.5% |
| Total | 100 |

In the case of milk chocolate or white chocolate, a portion or the whole of the dry and defatted cocoa is replaced by a skimmed or non-skimmed powdered milk, while of course preserving the proportions indicated in the general definition of the invention. The composition of the substantially solid mass comprises, according to one variant, an emulsifier, in particular lecithin. The lecithin content is preferably less than 1% by weight relative to the solid mass. The composition of the substantially solid mass may also comprise flavorings.

The sugars are in particular monosaccharides or disaccharides. Among the monosaccharides, there may be mentioned fructose, galactose and glucose. Among the disaccharides, there may be mentioned in particular sucrose which is the sugar commonly used for producing chocolate, but sucrose may be partially or completely replaced by another disaccharide such as lactose.

It has been found that the replacement of part of the sucrose by another disaccharide of the lactose type (in an amount of 0 to 50%) made it possible to obtain equivalent barrier properties of the chocolate toward the water.

Advantageously, however, the lactose content will be limited such that in the mass of chocolate or chocolate-like product, the sum (sugars+dry and defatted cocoa+skimmed milk powder−lactose) is greater than 10% by weight.

In general, the fat is cocoa butter. It is however possible to replace up to 20% of the cocoa butter by anhydrous milk fat (AMF) or to replace all or part of the cocoa butter by one or more SFC (solid fat content) vegetable fats 10° C. greater than 50%. According to another embodiment, all or part of the cocoa butter may be replaced by one or more vegetable fats of any SFC, provided that the SFC at 10° C. of the chocolate or chocolate-like product obtained is greater than or equal to 50%; preferably the SFC at 10° C. of the chocolate or chocolate-like product obtained will be greater than 70%.

The dry and defatted cocoa/(sugars and optionally skimmed milk powder) weight ratio is therefore less than 0.45. It has been noted, however, that for low local free waters, this ratio is less critical and may be increased up to 1.2. For example, it will be possible to have a ratio equal to 1.2 for an LFW<53%. It will then be possible to have a ratio equal to 1.2 for an LFW of between 53 and 65% if the chocolate or the like contains more than 58% of fat.

The expression chocolate-like product is understood to mean any confectionery fatty mass containing a continuous fatty phase consisting of one or more fatty substances of plant or animal origin and whose properties are similar to those of cocoa butter. These fatty masses are generally called compound or glazing paste.

The invention is remarkable in that the solid mass of chocolate or chocolate-like product may be provided in the form of chips or grains, in particular having a size greater than 4 mm, which allows consumers, when these chips are incorporated into a food composition, to recognize and appreciate the taste of the chocolate and the crunchy feel. In other words, the expression "grains of chocolate or a chocolate-like product" is understood to mean solid particles whose size is sufficient to confer on them the chocolate taste characteristic of this substance.

The expression grains is also understood to mean hydrophilic compounds such as biscuit, cereals, dry fruit, coated with a layer of solid mass of chocolate or the like It will also be noted that the chocolate or chocolate-like product according to the invention has a sugar content sufficient to make it possible to avoid the bitter taste inherent to cocoa.

The invention is also remarkable in that the substantially solid mass may be provided in the form of a shell partially or completely coating a moist filling. Because of its water-resistant character, the solid mass of chocolate or chocolate-like product makes it possible to preserve said filling for the appropriate period without losing its crunchy character.

The solid mass of chocolate or chocolate-like product may also be provided in the form of a continuous or discontinuous layer in contact with a moist medium or a multilayer structure consisting of layers separated by layers of a moist medium.

In general, it is possible to define the embodiments obtained from the solid masses of chocolate or chocolate-like product in the following manner:

Shell of solid mass coating a filling,

Shell of solid mass coating a filling loaded with grains of solid mass,

Food composition consisting of a moist medium and loaded with grains of solid mass, Food composition coated with a continuous or discontinuous top layer of solid mass. The applicant has found that the use of a layer which is discontinuous but has a sufficient equation, of the grain type, makes it possible to have a good compromise between, on the one hand, the requirement relating to the crunchy character and, on the other hand, the requirement relating to the ease of breaking the content with the spoon, ("the spoonability" in the professional jargon").

Multilayer structure comprising one or more layers of solid mass.

Other embodiments resulting from the combination of one or more of these variants are also included in the definition of the invention.

The moist medium may be, for example, a milk base such as a dairy product which is fermented or otherwise, in particular a yoghurt, a milk-based dessert cream or a fromage frais.

Depending on the thickness of the solid mass of chocolate or chocolate-like product, the value of $\tau$ should not exceed a maximum value in order to ensure resistance to water and therefore a sufficient crunchiness. The higher the thickness of the solid mass, the higher the maximum $\tau$ value. Accordingly, persons skilled in the art will be able to choose the optimum composition of the solid mass according to the desired thickness. Likewise, the value of $\tau$ should be chosen according to the shelf life and to the preservation temperature. The shorter the shelf life or the lower the temperature, the higher may be this value. In general, $\tau$ is advantageously less than 2, preferably less than 1.6.

Furthermore, taking into account the preceding text, in the case where the local free water content is greater than 70% and where the solid mass has a thickness of variant is characterized in that $\tau$ is less than or equal to 2, preferably less than 1.6. It is of course understood that the thickness is understood relative to the distance of the zone furthest from the moist medium. In other words, if a slice of solid mass is in contact on both sides with the moist medium, this zone will be the middle zone. In the case of a chip, the zone will be the central zone or central point.

As indicated above, the fat content of the compositions of chocolate or chocolate-like product is less than or equal to 80%; compositions which are particularly suitable have a fat content of less than or equal to 74%, in particular of less than or equal to 70%.

Preferably, the food product, for organoleptic reasons, is characterized in that the substantially solid mass comprises, as a percentage by weight:

| | |
|---|---|
| fat | 43 to 70% |
| sugars | >20% |
| dry and defatted cocoa | <15% |
| skimmed milk powder | <17% |

Advantageously, the food product is characterized in that the substantially solid mass comprises, as a percentage by weight:

| | |
|---|---|
| fat | 60 to 70% |
| sugars | >20% |
| dry and defatted cocoa | <12.4% |
| skimmed milk powder | <17% |

According to another embodiment, the substantially solid mass is a milk chocolate-like product and its composition corresponds to the following formula, the percentages being given by weight:

| | |
|---|---|
| fat | 43 to 70% |
| dry and defatted cocoa | <15% |
| skimmed milk powder | 5 to 17% |
| sugars | >13% |
| with sugars + skimmed milk powder | >20% |

According to the invention, the solid mass provides a particularly advantageous application in combination with a milk base. The food product is therefore characterized in that the moist medium has a local free water content of between 45 and 88% and comprises a milk base. The milk base constitutes the moist medium.

It includes in particular fillings or continuous phases based on fresh dairy product, fermented or otherwise, optionally with a degree of overrun, in the form of an oil-in-water emulsion and which contain one or more fats of milk origin or of plant origin, one or more sugars and one or more emulsifiers.

It is also possible to use hydrogenated fats of plant origin.

The filling or the continuous phase may also comprise fermented milk powder, skimmed or non-skimmed milk powder, in particular yoghurt, flavorings and an agent stabilizing the overrun.

There may be mentioned in particular the fillings or continuous phases described in patent applications WO-A-98/35566; WO 98/18337; FR-A-2 274 222.

An example of a dessert cream is given below as a moist medium or as a filling optionally loaded with solid matter of chocolate or chocolate-like product:

| | |
|---|---|
| fresh milk | 70 to 85% |
| skimmed powdered milk | 0 to 5% |
| MGLA | 0 to 2% |
| sugars | 4 to 12% |
| texturing agents | <2.5% |
| caramel | <10% | and optionally 1 to 30% of solid particles as described above in relation to the milk base.

According to a general embodiment, the food product is characterized in that the solid mass based on chocolate or a chocolate-like product is in the form of grains, of a shell partially or completely coating a milk filling or of a continuous or discontinuous layer deposited on a milk-based composition.

According to one embodiment, the food product is characterized in that it consists of a moist medium, comprising a milk-based composition loaded with grains of chocolate or a chocolate-like product. These food compositions are in particular packaged in pots.

It also relates to a filling comprising a milk base, optionally loaded with grains of chocolate or a chocolate-like product, said filling being coated with a shell consisting of a substantially solid mass of chocolate or a chocolate-like product as defined above.

The thickness of such an envelope is generally between 1 and 4 mm and the coating may be carried out by traditional molding or molding-pressing as described in patent application WO 98/35566.

According to another embodiment, the food product is characterized in that it consists of a milk-based moist medium, optionally loaded with grains of chocolate or a chocolate-like product, said moist medium being covered at the surface with a continuous or discontinuous layer of a solid mass of chocolate or a chocolate-like product.

According to another embodiment, it relates to a multilayer structure consisting of layers separated by a milk-based food composition and one or more continuous or discontinuous layers of solid mass of chocolate or a chocolate-like product.

The solid masses of chocolate or a chocolate-like product described above are produced according to traditional methods known in the art.

The examples below illustrate the invention.

Examples Relating to Slices of Chocolate

Various compositions of dark and milk chocolate or equivalent were prepared in a conventional manner. The chocolates all contained 0.5% lecithin, an emulsifier commonly used to increase the fluidity of the chocolate during its manufacture. Lecithin is counted with the fat.

The fat is either cocoa butter (+3.5% of AMF for the milk chocolate), or cocoa fat (Refined Hardened Coconut 32).

The chocolates were manufactured from cocoa liquor. For the coconut oil-based equivalents, the cocoa is provided in powdered form alkalinized to pH 7.

Slices of these compositions, 1.5±0.2 mm thick and 20 mm in diameter, were manufactured. The chocolates were tempered beforehand. In parallel, slices of chocolate having a thickness of 1±0.2 mm (fine chocolate) and 2±0.2 mm (thick chocolate) and a diameter of 20 mm were also manufactured. After 2 days at 20° C. then 12 hours at 10° C., the slices were placed in contact with the surface of a moist food base, containing 74% local free water. The value of $\tau$ was calculated under these conditions (74% local free water in the moist base) for each composition from equation (1). After 7, 14, 21, 28 and 35 days of storage at 10° C., the water content of the slices was measured by the "Karl Fischer" method OICCC No. 105 (1988).

The results are assembled in the table below. They show that:

- the lower the value of $\tau$, the more water-resistant the chocolates or their chocolate-like products,
- the replacement of cocoa butter by coconut fat does not modify the water-resistance properties of a chocolate (example 7),
- the smaller the thickness of a slice of chocolate or the like in contact with a moist base, the higher the uptake of water,
- for a given fat content, the chocolates or equivalents are more water-resistant if all or part of the cocoa is replaced by sugars or skimmed milk powder.

| Examples | Fat | % F | % DDC | % S | % SMP | DDC/(S + SMP) | τ | \multicolumn{5}{c}{Water content (%)} |
|---|---|---|---|---|---|---|---|---|---|---|---|---|
| | | | | | | | | 7 d | 14 d | 21 d | 28 d | 35 d |
| 1 | Cocoa butter | 55 | 10 | 35 | 0 | 0.29 | 2.62 | 9.0 | 11.7 | 14.1 | 15.7 | 17.3 |
| 1a fine | Cocoa butter | 55 | 10 | 35 | 0 | 0.29 | 2.62 | 12.5 | 16.2 | 19.8 | 22 | 24.1 |
| 1b thick | Cocoa butter | 55 | 10 | 35 | 0 | 0.29 | 2.62 | 6.9 | 8.9 | 10.2 | 12.3 | 13.8 |
| 2 | Cocoa butter + AMF | 55 | 4 | 30.5 | 10.5 | 0.1 | 1.58 | 5.9 | 7.5 | 9.2 | 10.4 | 10.9 |
| 3 | Cocoa butter | 55 | 0 | 45 | 0 | 0.00 | 0.79 | 3.7 | 4.6 | 5.1 | 5.8 | 6.0 |
| 4 | Cocoa butter | 70 | 8 | 22 | 0 | 0.36 | 1.55 | 5.2 | 7.3 | 8.1 | 9.8 | 10.6 |
| 5 | Cocoa butter | 70 | 5 | 25 | 0 | 0.20 | 1.17 | 4.3 | 5.7 | 6.8 | 7.5 | 8.4 |
| 6 | Cocoa butter | 70 | 0 | 30 | 0 | 0.00 | 0.41 | 1 | 1.9 | 1.2 | 2.2 | 3.9 |
| 7 | Cocoa fat | 70 | 0 | 30 | 0 | 0.00 | 0.41 | 1.5 | 2.3 | 3.5 | 3.6 | 3.9 |

F = fat
DDC = dry and defatted cocoa
S = sugars
SMP = skimmed milk powder

Examples Relating to Chocolate Chips

Chocolate chips are included in a moist medium with local free water 88% (natural yoghurt), 74% (dessert cream "Danette") or 45% (Chocolate mousse "Charles Gervais").

The chocolate is tempered and crystallized into chips (nearly spherical, diameter=3 mm) directly at the surface of the moist medium; and then a second layer of moist medium is applied.

The product is stored at 10° C./30 days.

Various compositions were studied (mixture of sugars, cocoa paste and cocoa butter; 0.5% lecithin, included in the fat). They are presented in the table below at the same time as their water uptakes after 30 days.

| Ex. | % F | % DDC | % S | DDC/S | LFW | τ | % water |
|---|---|---|---|---|---|---|---|
| 8 | 69 | 9 | 22 | 0.41 | 88 | 2.28 | 11.6 |
| 9 | 69 | 9 | 22 | 0.41 | 74 | 1.72 | 8.9 |
| 10 | 69 | 9 | 22 | 0.41 | 45 | 0.55 | 3.1 |
| 11 | 49 | 15 | 36 | 0.42 | 45 | 1.24 | 6.5 |
| 9 a | 69 | 17 | 14 | 1.21 | 74 | 2.44 | 15.7 |
| 10 a | 69 | 17 | 14 | 1.21 | 45 | 0.71 | 4.4 |

LFW = local free water
% water = mean water measured (D30).

Examples 8, 9 and 10 show that a chocolate containing 69% of F and a DDC/(S+FMP) ratio<0.45 has good water-resistance for a broad range of local free content.

Example 11 shows that a chocolate having an F level of 49% can have good water resistance if care is taken to maintain a τ of less than 3. For applications with a local free water content of around 45%, it is thus possible to use less fatty chocolates (20% of F less) which have more balanced organoleptic properties and whose cost price is lower.

The chocolate chips 8 to 11 and 10a remain quite crunchy in their described applications; the chocolate chips 9a are still crunchy, but markedly less than the others.

Examples Relating to Chocolate Sheets

Chocolate sheets which are water-resistant/crunchy, included in moist medium with local free water 74% (dessert cream "Danette") were produced by the following process:

Tempered chocolate is molded into disks having a diameter of 4.5 cm and a thickness of 1.8 or 1.2 mm. It is cooled to 12° C. and then stored for 24 hours at 20°, before introducing in depth into the moist medium, the whole is stored for 30 days at 10° C.

Various lecithin-free compositions based on sugar, cocoa paste and cocoa butter were studied. They are represented in the table below with their water uptakes, for two thicknesses of chocolate sheet.

| Ex. | % F | % DDC | % S | DDC/S | LFW | τ | t | % water |
|---|---|---|---|---|---|---|---|---|
| 12 | 69 | 3 | 28 | 0.11 | 74 | 0.92 | 1.8 | 8 |
| 13 | 69 | 9 | 22 | 0.41 | 74 | 1.72 | 1.8 | 14.7 |
| 14 | 79 | 2 | 19 | 0.11 | 74 | 0.44 | 1.2 | 5.4 |
| 15 | 79 | 6 | 15 | 0.4 | 74 | 0.9 | 1.2 | 10 | t (mm) thickness
% water mean water measured (30 days)

The water-resistant sheets of examples 12, 13, 14 and 15 remain crisp under the spoon and crunchy in the mouth after 30 days.

The same results were obtained with chocolates containing 0.5% of lecithin.

Examples Relating to Barrier Layers

Chocolate layers 1.6 mm thick were prepared as a barrier layer against water protecting hydrophilic compounds (biscuits, hazelnuts, caramels and the like) in a moist medium with local free water 74% (dessert cream "Danette").

The crisp ingredients such as biscuits/cereals, dry fruits (hazelnuts, almonds and the like), dried fruits (bananas, chips and the like), caramels and other boiled sugars, become very rapidly rehydrated in LFW>45% and thus lose their crunchiness. This is all the more fast, the higher the LFW of the medium containing them. One of the most difficult applications consists in protecting cereals contained in such a moist medium: their loss of crunchiness normally occurs in less than 10 minutes.

Round extruded cereal billets (diameter 3–4 mm) are sugar-coated in pans with nontempered chocolate at 40° C. The thickness of the chocolate is 1.6 mm. After 24 hours of storage at 20° C., these billets are introduced into the moist medium; the whole is stored for 30 days at 10° C.

The water therefore migrates in a single direction (from the outside to the inside of the billet), which is a case similar to the applications of the examples relating to the slices.

The two compositions are indicated in the table below with their water uptakes:

| Ex. | % F | % DDC | % S | SMP | DDC/S | LFW | τ | % water |
|---|---|---|---|---|---|---|---|---|
| 16 | 69 | 9 | 22 |  | 0.41 | 74 | 1.72 | 9.5 |
| 17 | 50 | 4.5 | 35 | 10.5 | 0.1 | 74 | 1.89 | 10.4 |

The chocolates are composed of cocoa butter, sucrose, cocoa paste and 0.5% of lecithin (included in the fat). Example 17 also contains 3.5% of AMF (included in the 50% of F) and skimmed milk powder.

The two chocolate formulas (one dark and one milk) made it possible to preserve the crunchiness of the cereals (<2% billets broken up) by forming a barrier layer against water.

Example Comprising the Barrier Properties of Different Chocolates or the Like Slices of chocolate 1.5+/−0.2 mm were manufactured as described in the first example. After two days at 20° C. and then 12 hours at 10° C., they are placed in contact with a moist food base containing 74% of local free water.

Various compositions are studied (mixture of sugars, cocoa paste, cocoa butter and 0.5% of lecithin included in the fat). The products are stored at 10° C. for 35 days, the water contents are measured by the "Karl Fischer" method OICCC No. 105 (1988).

The compositions produced and the water contents measured during the preservation are presented in the table below:

| Examples | % F | % DDC | % S | % SMP | DDC/(S + SMP) | τ | \multicolumn{5}{c}{Water content (%)} |
|---|---|---|---|---|---|---|---|---|---|---|---|

| Examples | % F | % DDC | % S | % SMP | DDC/(S + SMP) | τ | 7 d | 14 d | 21 d | 28 d | 35 d |
|---|---|---|---|---|---|---|---|---|---|---|---|
| 18 | 79 | 16 | 5 | 0 | 3.20 | 1.63 | 5.2 | 6.9 | 8 | 9.4 | 10.3 |
| 19 | 79 | 5 | 16 | 0 | 0.31 | 0.80 | 3 | 4.1 | 4.9 | 5.3 | 5.9 |
| 20 | 70 | 15 | 15 | 0 | 1.00 | 2.20 | 6.9 | 8.8 | 12.1 | 13 | 13.2 |
| 21 | 70 | 0 | 30 | 0 | 0.00 | 0.37 | 1 | 1.9 | 1.2 | 1.9 | 2.2 |
| 22 | 50 | 25 | 25 | 0 | 1.00 | 4.73 | 17.5 | 21.3 | 24.4 | 25.9 | 24.7 |
| 23 | 50 | 4 | 45.5 | 10.5 | 0.07 | 1.77 | 6.2 | 8.4 | 10 | 11.3 | 12.1 |
| 24 | 50 | 0 | 50 | 0 | 0.00 | 0.92 | 3 | 4.6 | 3.8 | 6.4 | 6.5 |

The examples above show that the amount of fat is not the only parameter to be controlled in order to formulate water-resistant chocolates. Thus, for the same fat content, it is observed that the lower the value of τ, the more water-resistant will be a chocolate or the like.

Likewise, for the same fat content, the water resistance increases if all or part of the dry and defatted cocoa is replaced by sugars or skimmed milk powder, therefore if the DDC/(P+SMP) ratio decreases.

Likewise, a chocolate containing 50% fat (examples 23 and 24) will be as water-resistant or even more water-resistant than a chocolate containing 70% fat (example 20) placed under the same conditions.

What is claimed is:

1. A food product, comprising a substantially solid mass based on chocolate or a chocolate-like product in contact with a moist medium in non-frozen state, having a local free water content of from 45% to 88%, said substantially solid mass having a low water uptake under appropriate preservation conditions, wherein the substantially solid mass of chocolate or a chocolate-like product comprises, as a percentage by weight:

| | |
|---|---|
| fat | 43 to 80% |
| dry and defatted cocoa | <18% |
| skimmed milk powder | <17% |
| sugars | >13% | the dry and defatted cocoa/(sugars and optionally skimmed milk powder) weight ratio being less than 0.45 and the solid mass being such that for the moist medium having a local free water content of from 45 to 88%, the parameter (τ) is less than 3, the parameter τ being defined by the equation (1):

$$\tau = (-[water] + 0.37) \times F + (5.25 \times [water] - 1.67) \times (S + SMP) + (26.2 \times [water] - 9.6) \times C + (61 \times [water] - 14.5) \times (S + SMP) \times C, \text{ with:}$$

[water] is the local free water content of the moist phase in contact (in g/g),

F is the fat content of the chocolate or equivalent (in g/g),

S+SMP is the content of sugars+skimmed milk powder of the chocolate or equivalent (in g/g), C is the dry and defatted cocoa content of the chocolate or equivalent (in g/g).

2. The food product of claim 1, wherein τ is less than or equal to 2.

3. The food product of claim 2, wherein τ is less than 1.6.

4. The food product of claim 1, wherein the substantially solid mass comprises, as a percentage by weight:

| | |
|---|---|
| fat | 43 to 70% |
| dry and defatted cocoa | <15% |
| skimmed milk powder | <17% |
| sugars | >20%. |

5. The food product of claim 1, wherein the substantially solid mass comprises, as a percentage by weight:

| | |
|---|---|
| fat | 43 to 70% |
| dry and defatted cocoa | <15% |
| skimmed milk powder | 5 to 17% |
| sugars | >13% |
| with sugars + skimmed milk powder | >20%. |

6. The food product of claim 1, wherein the substantially solid mass comprises, as a percentage by weight:

| | |
|---|---|
| fat | 60 to 70% |
| dry and defatted cocoa | <12.4% |
| skimmed milk powder | <17% |
| sugars | >20%. |

7. The food product of claim 1, wherein the moist medium containing a local free water content of from 45 to 88% is a continuous phase comprising a milk base.

8. The food product of claim 1, wherein the solid mass based on chocolate or a chocolate-like product comprises grains, a shell partially or completely coating a milk filling, or a continuous or discontinuous layer deposited on a milk-based composition.

9. The food product of claim 8, comprising a moist medium, comprising a milk-based common loaded with grains of the chocolate or chocolate-like product.

10. The food product of claim 8, comprising a food bar comprising a shell made of the chocolate or chocolate-like product and a milk filling, optionally loaded with grains of the chocolate or chocolate-like product.

11. The food product of claim 8, comprising a milk-based moist medium, optionally loaded with grains of the chocolate or chocolate-like product, said moist medium being covered at the surface with a continuous or discontinuous layer of a solid mass of the chocolate or chocolate-like product.

12. The food product of claim 8, comprising a multilayer structure comprising layers separated by a milk-based food composition and one or more layers of solid mass of the chocolate or chocolate-like product.

13. The food product of claim 1, wherein the fat is cocoa butter, anhydrous milk fat (AMF), one or more vegetable oils, or mixtures thereof.

14. The food product of claim 13, wherein the fat comprises 80 to 100% of cocoa butter and 0 to 20% of anhydrous milk fat.

15. The food product of claim 1, wherein the sugar is one or more disaccharides, one or more monosaccharides, or mixtures thereof.

16. The food product of claim 15, wherein the one or more disaccharides comprise 50 to 100% of sucrose and 0 to 50% of lactose.

17. The food product of claim 1, comprising an emulsifier.

18. The food product of claim 1, wherein the sugar is sucrose, lactose, fructose, or mixtures thereof.

19. The food product of claim 17, wherein the emulsifier comprises lecithin.

* * * * *